(12) United States Patent
Sack et al.

(10) Patent No.: US 7,479,607 B2
(45) Date of Patent: Jan. 20, 2009

(54) CONTROL KNOB WITH SAFETY FEATURE

(75) Inventors: James A. Sack, Elverson, PA (US);
Thomas Nilsen, Northboro, MA (US);
Arnold E. Vandoren, Sterling, MA (US)

(73) Assignee: Bose Corporation, Framingham, MA (US)

( * ) Notice: Subject to any disclaimer, the term of this patent is extended or adjusted under 35 U.S.C. 154(b) by 122 days.

(21) Appl. No.: 11/495,129

(22) Filed: Jul. 28, 2006

(65) Prior Publication Data

US 2008/0023313 A1 Jan. 31, 2008

(51) Int. Cl.
*H01H 19/02* (2006.01)
(52) U.S. Cl. .............................. 200/4; 200/5 A; 200/5 R
(58) Field of Classification Search .................. 200/4, 200/5 A, 5 R, 11 R, 17 R, 18, 302.01, 302.02, 200/336, 341, 520–527, 560, 564, 570
See application file for complete search history.

(56) References Cited

U.S. PATENT DOCUMENTS

| | | | |
|---|---|---|---|
| 4,051,916 A | | 10/1977 | Oda |
| 4,218,775 A | * | 8/1980 | Cox et al. .................... 455/344 |
| 4,453,152 A | * | 6/1984 | Dob et al. .................... 338/197 |
| 5,093,764 A | | 3/1992 | Yoshihiko et al. |
| 5,665,946 A | | 9/1997 | Nishijima et al. |
| 6,073,312 A | | 6/2000 | Dao et al. |
| 6,154,201 A | | 11/2000 | Levin et al. |
| 6,410,871 B1 | * | 6/2002 | Rarbach ..................... 200/336 |
| 6,512,189 B1 | * | 1/2003 | Schuberth et al. ........... 200/334 |
| 6,621,016 B2 | * | 9/2003 | Ohba et al. .................... 200/4 |
| 6,667,446 B1 | * | 12/2003 | Schuberth et al. .............. 200/4 |

FOREIGN PATENT DOCUMENTS

| | | |
|---|---|---|
| DE | 25 57 859 A1 | 8/1976 |
| DE | 84 28 301 U1 | 10/1985 |
| DE | 100 26 214 A1 | 11/2001 |
| DE | 100 56 307 A1 | 5/2002 |
| EP | 0 795 807 A | 9/1997 |
| EP | 0 644 402 B1 | 8/1998 |
| EP | 1 215 693 A | 6/2002 |

(Continued)

OTHER PUBLICATIONS

EU Council Directive 74/60/EEC, Dec. 17, 1973, file 31974L0060 downloaded from http://eur-lex.europa.eu/LexUriServ/LexUriServ.do?uri=CELEX:31974L0060:EN:HTML Jun. 26, 2006.

(Continued)

*Primary Examiner*—Elvin G Enad
*Assistant Examiner*—Marina Fishman

(57) ABSTRACT

In a dual-concentric knob, an inner knob acts as a solid ergonomically functional knob for forces below a threshold and collapses into an outer knob for forces above the threshold. In some examples the inner knob also acts as a push button for forces below the threshold.

A hand-operated control is mounted on a hub for axial movement between a first position and a second position relative to the hub, a mechanism axially rigidly couples the control to the hub in the first position unless a force greater than a threshold is applied to the control, and a mechanism rotationally couples the control to the hub in both the first and the second positions.

27 Claims, 8 Drawing Sheets

FOREIGN PATENT DOCUMENTS

| | | |
|---|---|---|
| EP | 1 248 274 A2 | 10/2002 |
| EP | 1 428 699 A | 6/2004 |
| EP | 1 533 195 A | 5/2005 |
| EP | 1 544 880 A | 6/2005 |
| WO | 2005/009816 A | 2/2005 |
| WO | PCT/US2007/074332 | 12/2007 |

OTHER PUBLICATIONS

EU Commission Directive 78/632/EEC, May 19, 1978, file 31978L0632 downloaded from http://eur-lex.europa.eu/LexUriServ/LexUriServ.do?uri=CELEX:31978L0632:EN:HTML Jun. 26, 2006.

2000/4/EC of the European Parliament and of the Council, Feb. 28, 2000, file 32000L0004 downloaded from http://eur-lex.europa.eu/LexUriServ/LexUriServ.do?uri=CELEX:32000L0004:EN:HTML Jun. 26, 2006.

Maserati, Quattroporte instrument panel design, http://www.maserati.com/, downloaded from the Internet Jul. 26, 2006.

International Preliminary Report on Patentability dated Nov. 3, 2008 for Appl. No. PCT/US2007/074332.

* cited by examiner

CONTROL KNOB WITH SAFETY FEATURE

BACKGROUND

This description relates to a control knob with a safety feature.

To reduce injury to passengers, vehicle safety standards require that control knobs and other devices that extend beyond a surrounding surface plane collapse to the level of that plane if forces on the knob exceed a specified threshold, as they might during a crash.

SUMMARY

In general, in one aspect, in a dual-concentric knob, an inner knob acts as a solid ergonomically functional knob for forces below a threshold and collapses into an outer knob for forces above the threshold. In some examples the inner knob also acts as a push button for forces below the threshold.

In general, in one aspect, a hand-operated control is mounted on a hub for axial movement between a first position and a second position relative to the hub, a mechanism axially rigidly couples the control to the hub in the first position unless a force greater than a threshold is applied to the control, and a mechanism rotationally couples the control to the hub in both the first and the second positions.

Implementations may include one or more of the following features. A resilient element applies force to the control toward the first axial position whenever the control is not in the first axial position. In the first axial position, a first portion of the first control extends beyond a plane. In the second axial position, the first portion of the first control does not extend beyond the plane. The first portion includes a material having a durometer greater than 50 shore A. A second portion of the first control extends beyond the plane in both the first and second axial positions. The second portion includes a material having a durometer less than 50 shore A. The plane is defined by a surface of a device that is controlled by the control. The plane is defined by a surface of a second control that surrounds the first control. The plane defined by the surface of the second control is about 9.75 mm from a surface of a device that is controlled by the first and second controls. The second control is included. The second control is coaxial with the first control. The second control includes a ring concentric with the first control. An encoder is coupled to the hub by a shaft. The encoder is configured to receive rotational input from the control by rotation of the shaft. The encoder is also configured to receive second rotational input from a second control coaxial with the first control by rotation of a second shaft coaxial with the first shaft. The encoder is configured to receive axial input from the control by axial movement of the shaft. The threshold is in the range of about 40 to about 378 newtons. The threshold is about 57 newtons.

In general, in one aspect, a first hand-operated control is mounted on a hub for axial movement between a first position and a second position relative to the hub, a mechanism axially rigidly couples the control to the hub in the first position unless a force greater than a threshold is applied to the control, and a second hand-operated control surrounds the first control. In the first axial position, a first portion of the first control extends beyond a plane defined by a surface of the second control. In the second axial position, the first portion of the first control does not extend beyond the plane.

Implementations may include one or more of the following features. The second control is coaxial with the first control. The second control includes a ring concentric with the first control. An encoder is coupled to the hub by a first shaft and is coupled to a hub of the second control by a second shaft coaxial with the first shaft. The encoder is configured to receive rotational input from the first control by rotation of the first shaft, and to receive rotational input from the second control by rotation of the second shaft.

In general, in one aspect, a first hand-operated control is mounted on a hub for axial movement between a first position and a second position relative to the hub. The control includes a first portion having a hardness greater than about 50 shore A and a second portion having a hardness less than about 50 shore A. A mechanism axially rigidly couples the control to the hub in the first position unless a force greater than about 57 newtons is applied to the control. A second hand-operated control includes a ring concentric with the first control. In the first axial position, the first portion of the first control extends beyond a plane defined by a surface of the second control. In the second axial position, the first portion of the first control does not extend beyond the plane. The second portion of the first control extends beyond the plane in both the first and second axial positions.

In general, in one aspect, a user interface device for use in automobiles includes a control knob for controlling at least one function of the device and mounted on a hub for axial movement between a first position and a second position relative to the hub, a mechanism that axially rigidly couples the control knob to the hub in the first position unless a force greater than a threshold is applied to the control knob, and a hand-operated control ring for controlling at least one second function of the device and that surrounds the control knob. In the first axial position, a first portion of the control knob extends beyond a plane defined by a surface of the control ring. In the second axial position, the first portion of the control knob does not extend beyond the plane. The user interface device may include one or a combination of a radio; a multimedia playback device; a navigation system; a control interface for a climate control system; a communications device; and a personal computer.

Advantages include the ability to provide a dual-concentric, three-function knob that acts as a solid, ergonomically functional control while meeting safety standards. The knob can still be used after the safety feature is activated and the parts separated.

Other features and advantages will be apparent from the description and the claims.

DESCRIPTION

FIGS. 4B-E are isometric views of the assembly of a control knob.

Figure 1:
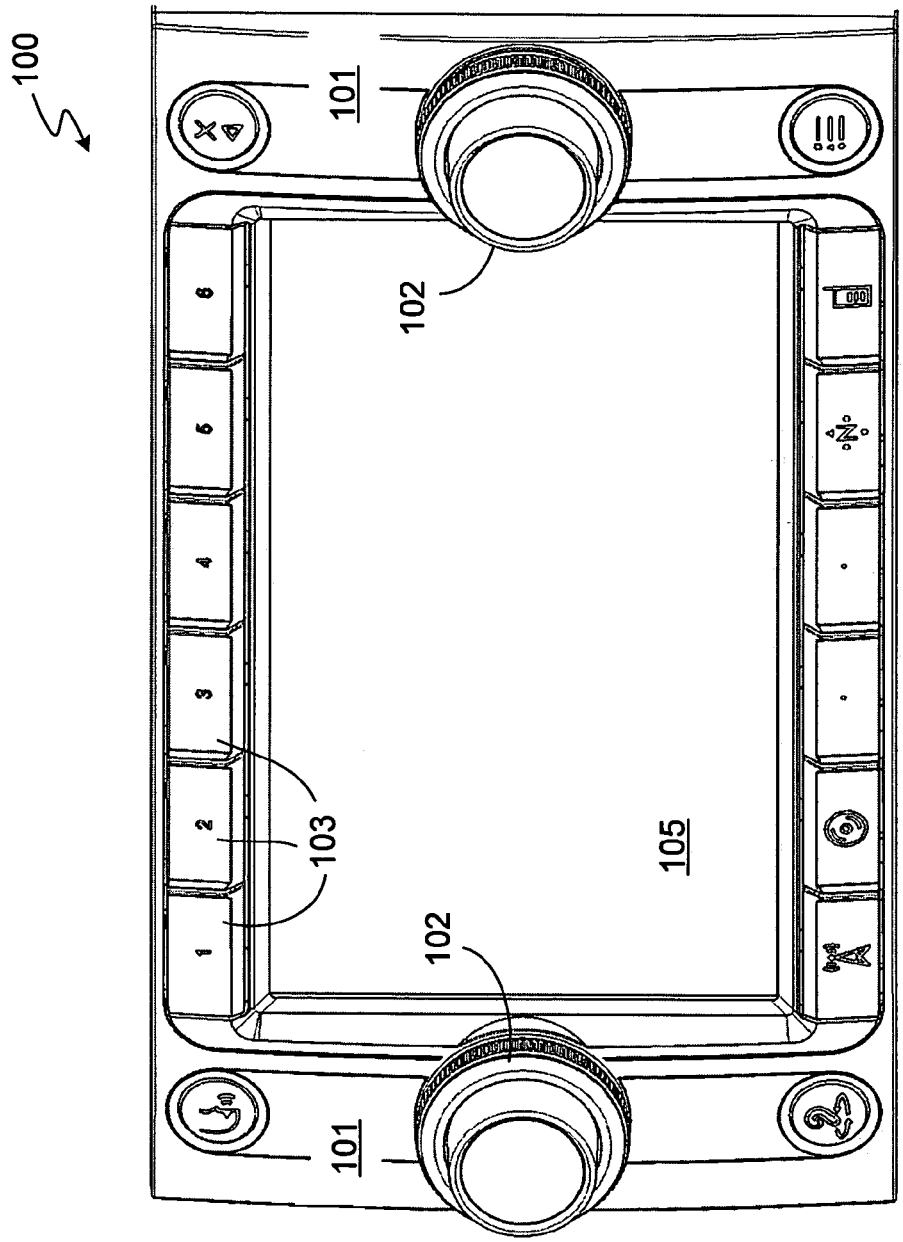
FIG. 1 is a perspective view of a control panel.

Control panels in vehicles, for example, a control panel 100 for a radio, a navigation system, a DVD or other media player, a climate control system, a cellular telephone or other communications device, a personal computer, or some other device as shown in FIG. 1, sometimes include knobs 102 that extend outward from the face plane 101 of the control panel. If the vehicle makes a sudden stop, passengers may injure themselves on such knobs. Other controls such as buttons 103 and a display 105 are generally flush with the surface 101 or recessed below it and do not generally cause injury. The word knob includes, for example, buttons, dials, switches, and levers.

To reduce the chances of such injuries, knobs and other protrusions are required either to retract or to be less than a specified hardness. For example, under the European Convention Homologation rule 74/60/EEC ¶5.1.5, a protrusion that extends more than 9.75 mm from the surface behind it must collapse into that surface so that it protrudes less than 9.75 mm if a force greater than 378 N (84.98 lbf) is applied to it. Because materials having a hardness of less than 50 on the Shore A scale (referred to as "50 shore A") are ignored when measuring dimensions and positions under this rule, the portions of the knobs made of such materials can extend beyond the specified limits. Other jurisdictions may specify other criteria, e.g., larger or smaller lengths, harder or softer materials. The criteria specified by any given jurisdiction may change over time, which may necessitate changes in the design of control features.

Figure 2A:
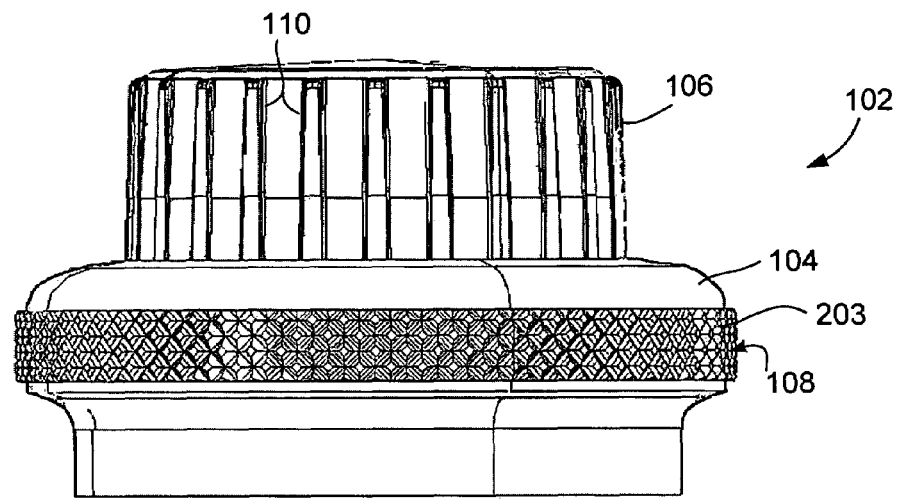
FIG. 2A is a side view of a control knob.
Figure 2B:
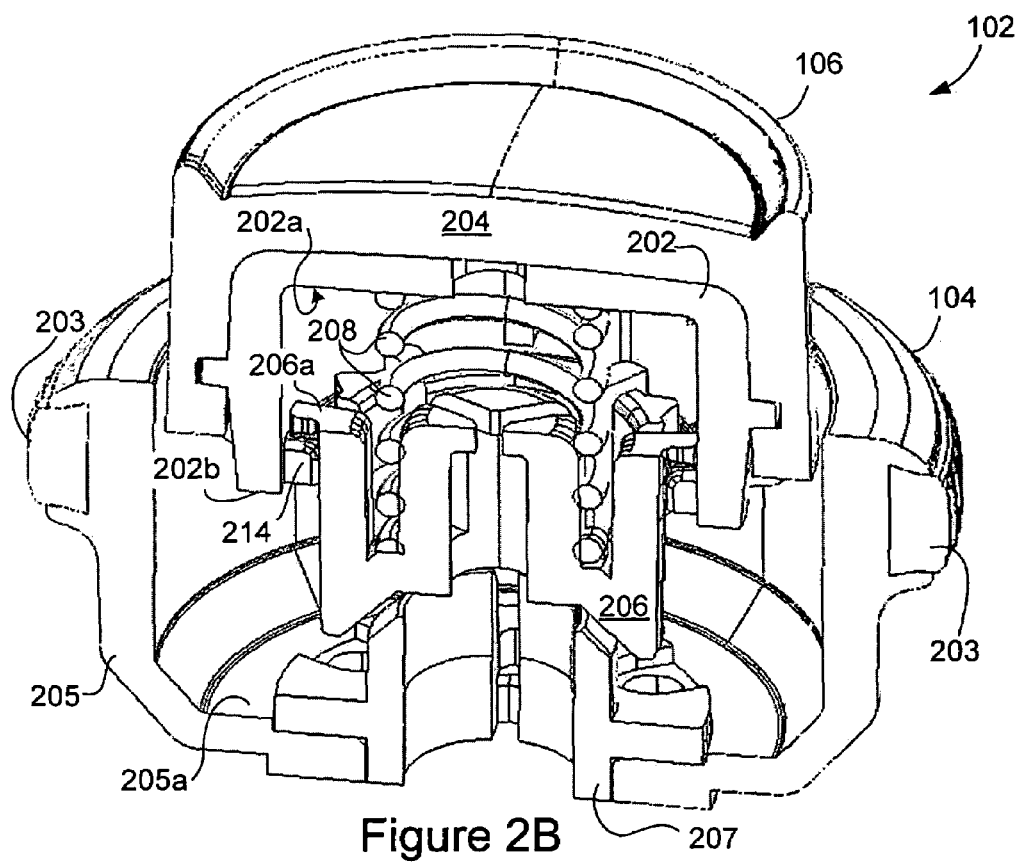
FIG. 2B is a cross-sectional isometric view of a control knob.

In some examples, as shown in FIG. 2A, a knob 102 has two concentric rotational parts that can each rotate independently of one another, an outer ring 104 for controlling one set of functions, and an inner, taller knob 106 for controlling another set of functions. The inner knob 106 may also function as a push-button switch. In the example of FIG. 2A, the outer ring 104 has a first texture 108 formed by knurling a band of material 203, and the knob 106 has a second texture 110 formed of ridges. Other textures and surface finishes are possible. A dual-concentric knob of this design, with a push-button feature on the inner knob, provides at least three controls in a single package, allowing easy operation with minimal requirements for the user to take his eyes off the road to find the controls. In some examples, the outer knob could provide the push-button or both knobs could provide that feature.

Figure 3A:
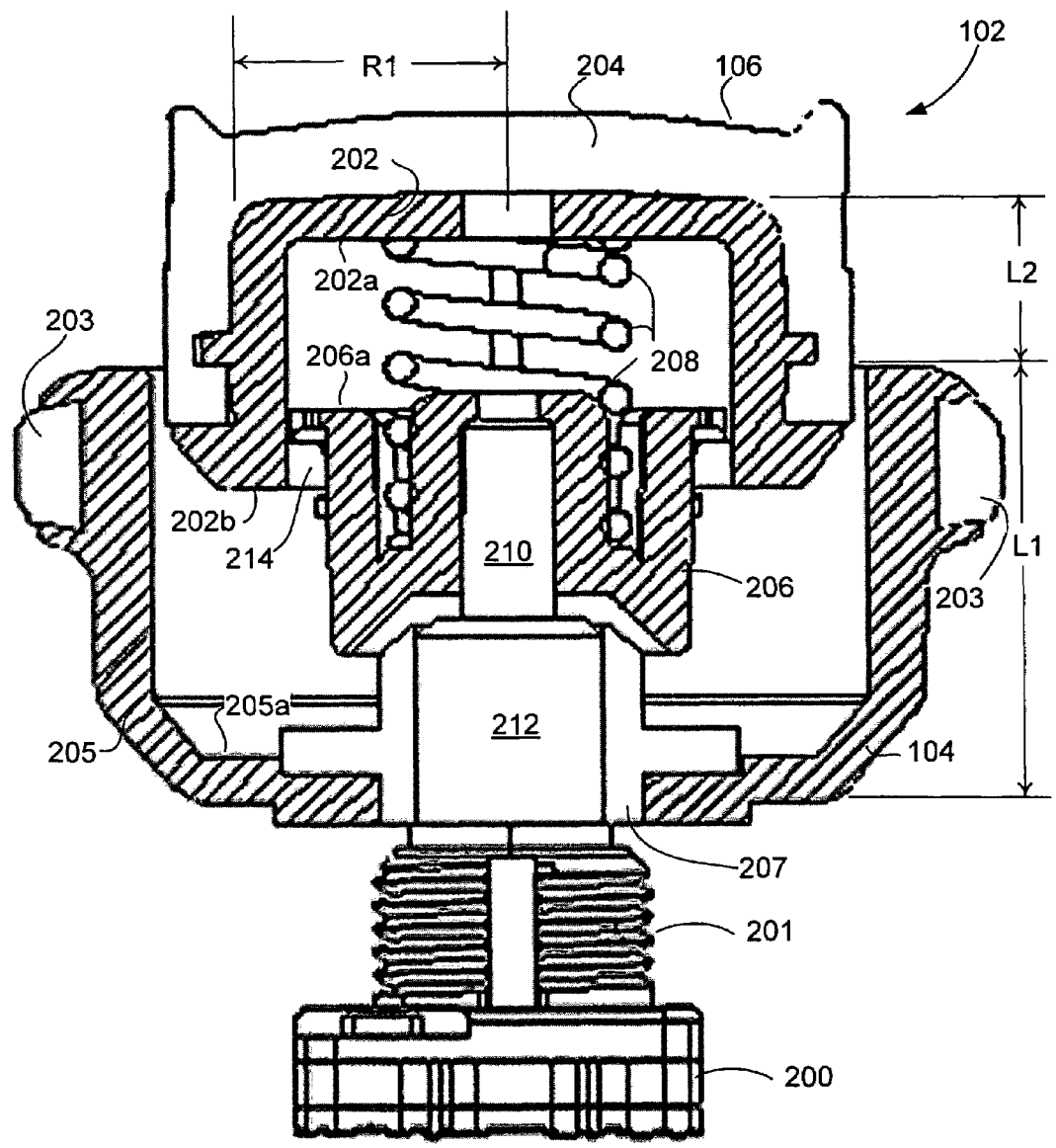
FIG. 3A and 3B are cross-sectional side views of a control knob.
Figure 3B:
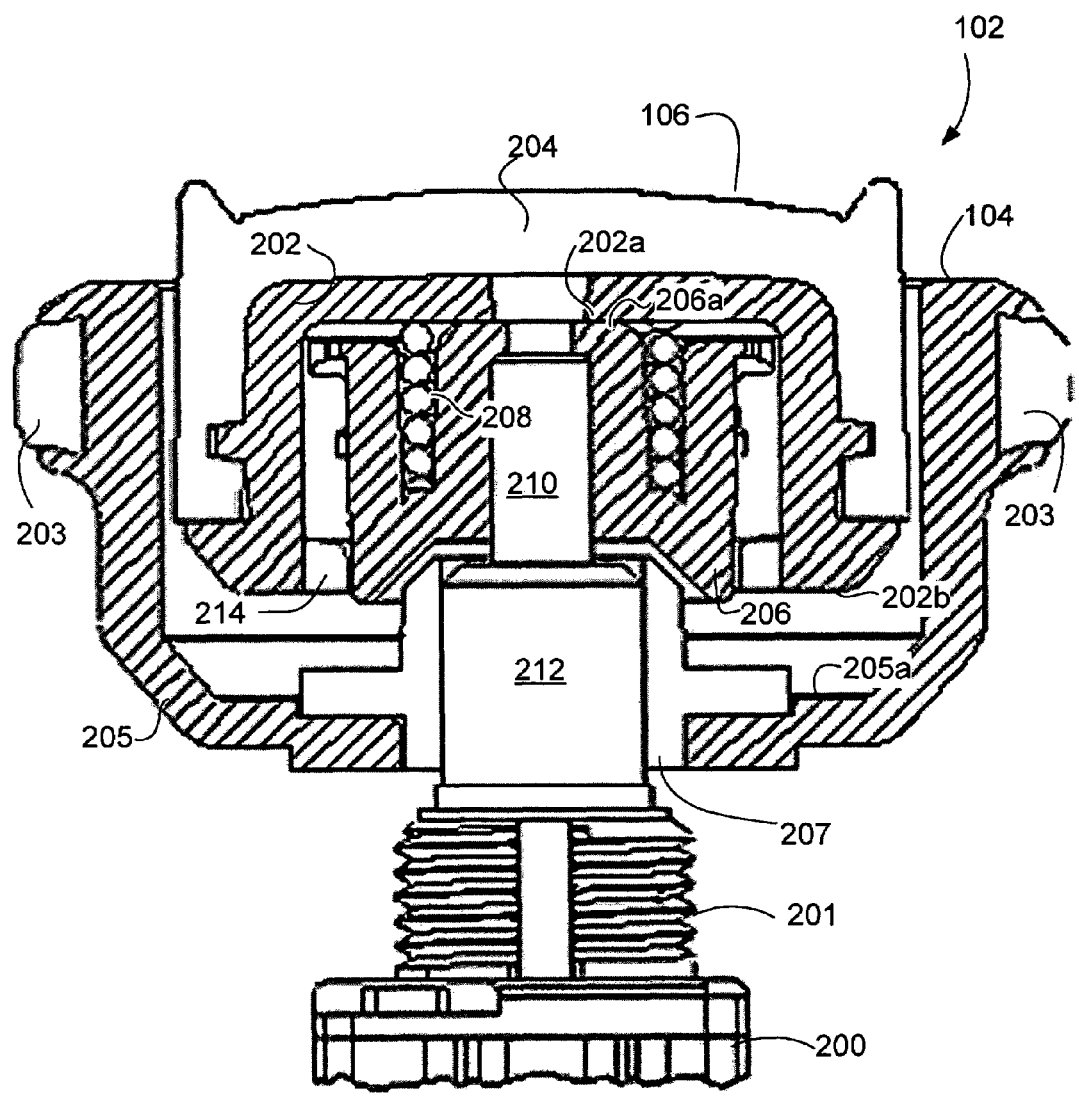

As shown in FIGS. 3A and 3B, the knob 106 and ring 104 are coupled to a rotational encoder 200 through hubs 207 and 206 and shafts 210 and 212. In the example of the figures, the encoder 200 has a threaded outer extension 201 for attaching to the control panel 100 (FIG. 1). The encoder 200 receives the rotational or push-button inputs of the ring 104 and knob 106 and converts them to electrical signals, which are in turn transmitted to appropriate electronics (not shown). Dual-encoder devices having a rotational encoder coupled to each of two concentric shafts and a push-button input coupled to at least one of the shafts are well-known, for example, the 62HY2222014 or 62HY2211001 dual-concentric encoders from Grayhill, Inc., of La Grange, Ill.

In some examples, the inner knob 106 may be composed of two or more materials having different hardnesses. An inner core 202 is composed of a relatively harder material, and an outer cover 204 is composed of a softer material. Similarly, the knurled portion 203 of the outer ring 104 can be formed of a softer material and the remainder 205 formed of a harder material. If the outer cover 204 is softer than 50 shore A, and the inner core 202 is harder than 50 shore A, then it is the dimensions of the inner core 202 that are considered for compliance with safety rules. Under the EEC rules, if the outer ring 104 takes up the 9.75 mm allowed for such a protrusion (distance L1 in FIG. 3A), the inner knob 106 will be required to collapse into the outer ring 104 (i.e., it must collapse by distance L2). When the knob 106 is collapsed, as shown in FIG. 3B, the hard core 202 must be retracted fully into the outer ring 104, but the softer cover 204 may continue to extend beyond it, provided it is less than 50 shore A in durometer. If the outer ring 104 were absent, the core 202 would need to retract to within 9.75 mm of the underlying surface 101 (FIG. 1). The dimensions of the outer cover 204 and other components, including body 205 and knurled portion 203 of the outer ring 104, can be selected to provide a size and shape that is needed for the knob 102 to be ergonomically functional, that is, to allow its user to grip the inner knob 106 or outer ring 104 and rotate each of them comfortably and effectively.

In some examples, the hub 206 and a spring 208 are configured to allow the knob 106 to collapse into the outer ring 104. Clips 214 transfer force from the core 202 to the hub 206, such that turning or pushing the knob 106 will turn or push the shaft 210. In some examples, the clips 214 provide a rigid linkage between the core 202 and the hub 206. In this way, pushing on the knob 106 will appear, to the user, to merely move it the small amount (e.g., 1 mm or less) needed to trigger the push-button mode of input. As long as the clips 214 are intact, the knob 106 will appear to the user to be a single rigid piece with the usual functionality and behavior expected of a non-collapsible knob. When a threshold force on the knob 106 is exceeded, the clips 214 will break or separate, and core 202 will move downward over the hub 206, compressing the spring 208, as shown in FIG. 3B. In some examples, the clips 214 may have fingers that will ride up and down within grooves and therefore will continue to transfer rotational force from the knob 106 to the hub 206 in the collapsed position, allowing the knob to function as an input device even while collapsed.

In some examples, the lower surface 202a of the top wall of the core 202 contacts the top surface 206a of the hub to stop downward movement of the knob 106, as shown in FIG. 3B. In some examples, the bottom edge 202b of the core 202 contacts the top surface 205a of the bottom of the outer ring 104 to stop the knob 106's movement (not shown).

After the collapsing force is removed, the spring 208 will push the knob 106 back to its nominal position, i.e., that shown in FIG. 3A. In some examples, the clips 214 may be configured to re-attach the core 202 to the hub 206 when it is returned to its extended position. In some examples, the clips may not re-attach, in which case, the spring 208 will continue to hold the knob 106 in approximately its original extended position, but there will be no rigid linkage between the core 202 and hub 206, or there may be only rotational linkage. In some examples, rotational linkage is maintained with reduced functionality, for example, the knob 106 may have a few degrees of play before rotation is transferred to the hub 206. Pressing on the knob 106 will compress the spring, and may ultimately apply enough force to the hub 206 to activate the push-button function of the encoder 200, but it may require the knob 106 to be pushed farther and with greater force than is normally required. Replacement of one or more parts (e.g., inner knob 106 and hub 206, or the entire knob 102) may be required to restore the original rigid linkage. Replacement knobs can be supplied with the vehicle or to dealers and service centers. The collapsed knob can be replaced quickly and easily by reversing and then repeating the assembly process described below.

Figure 4A:
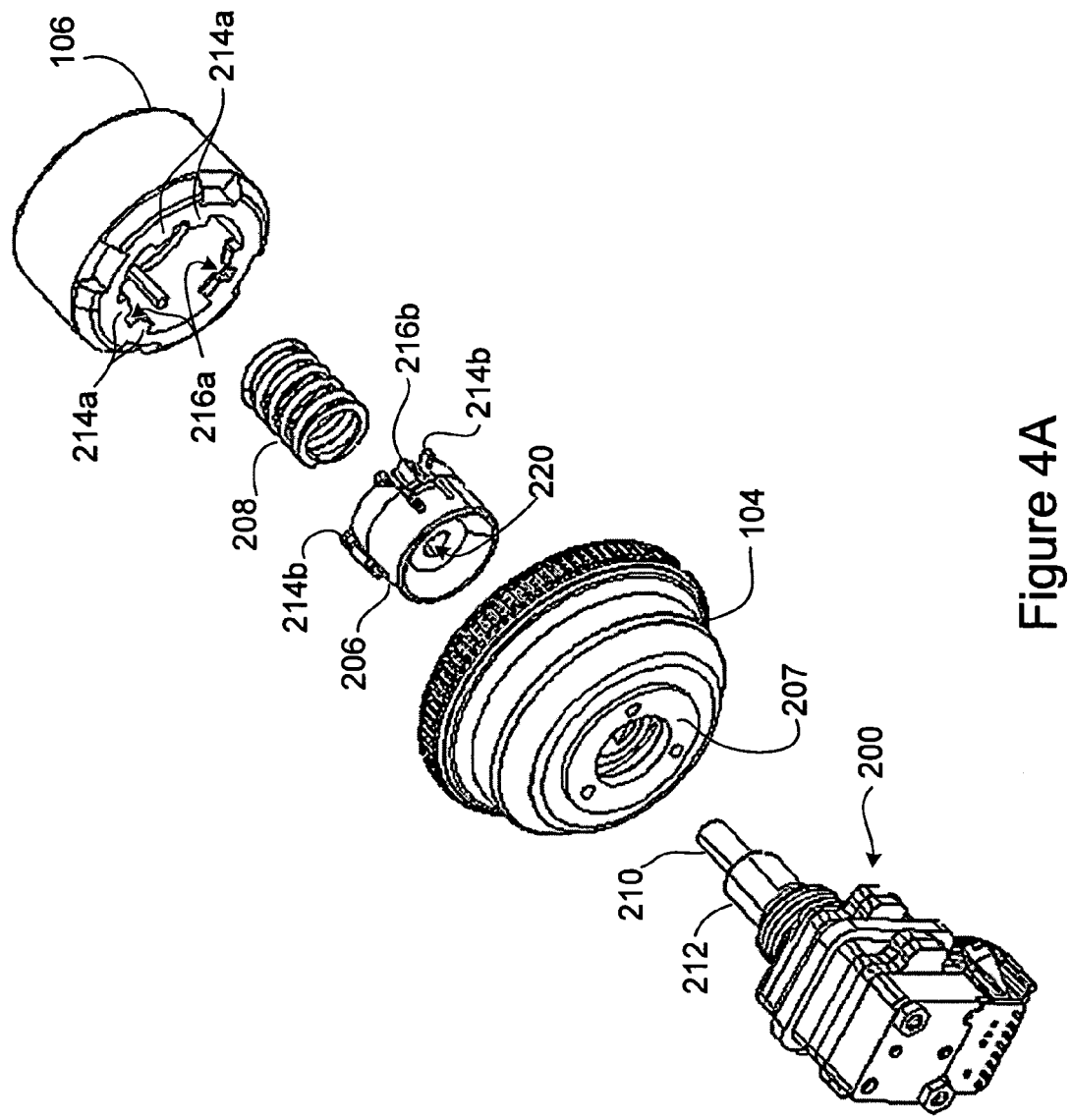
FIG. 4A is an exploded isometric view of a control knob.
Figure 4B:
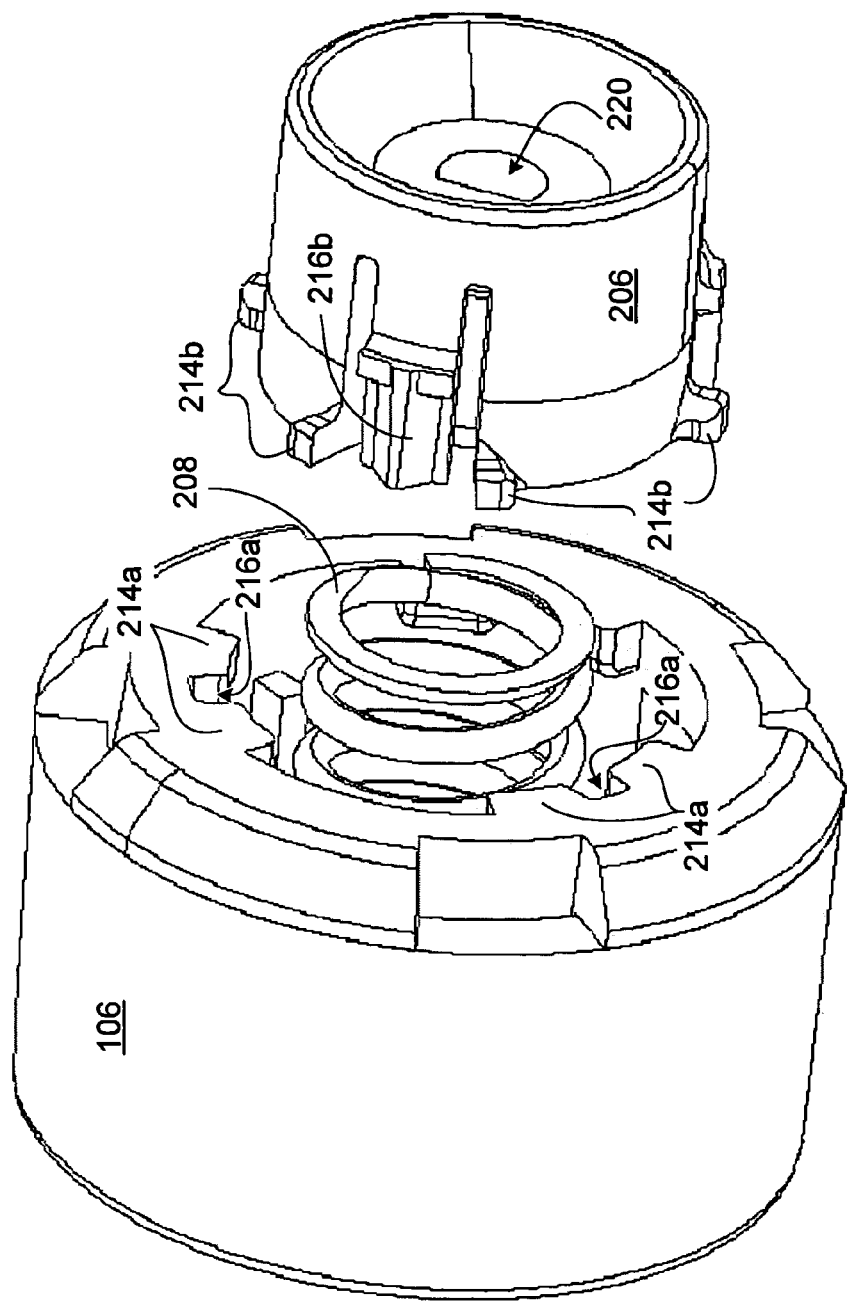
Figure 4C:
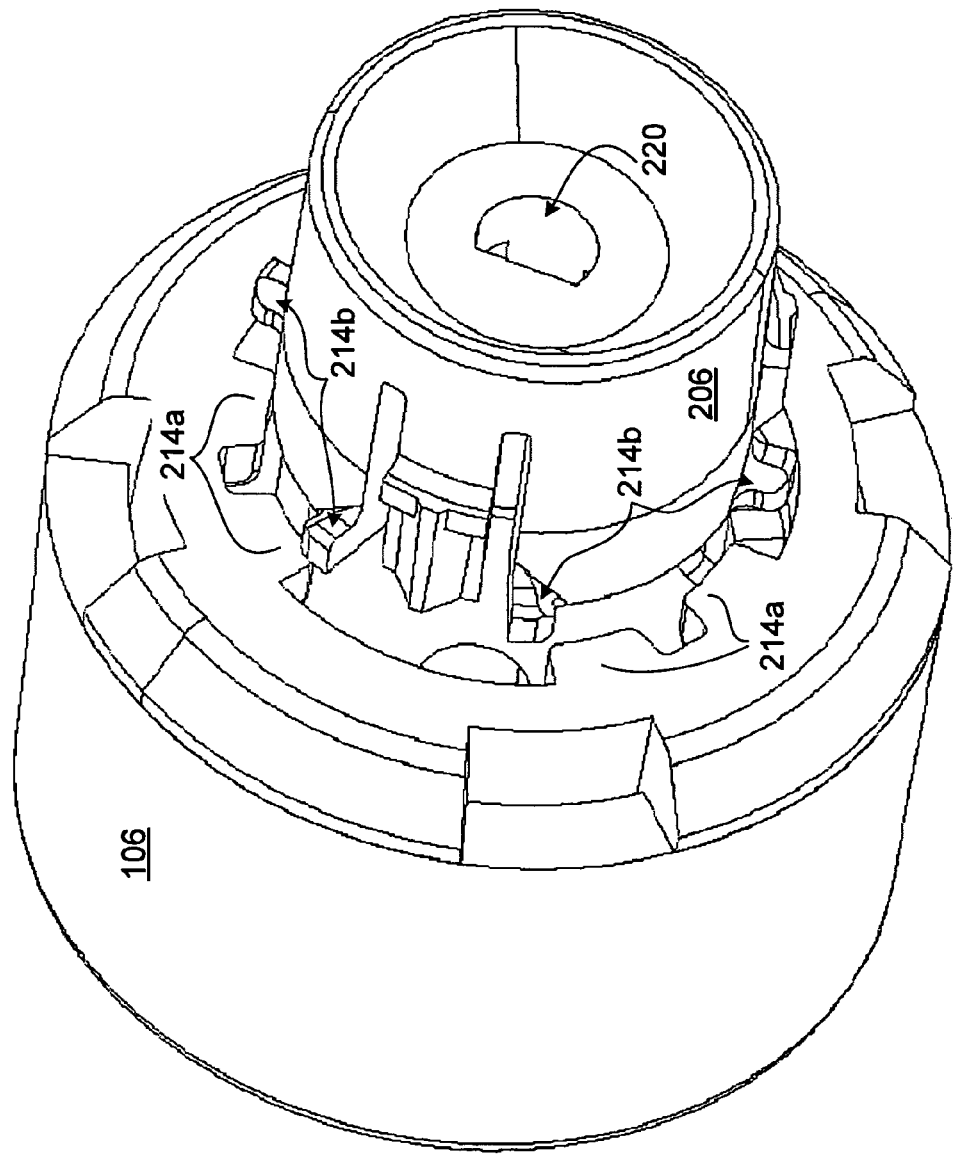
Figure 4E:
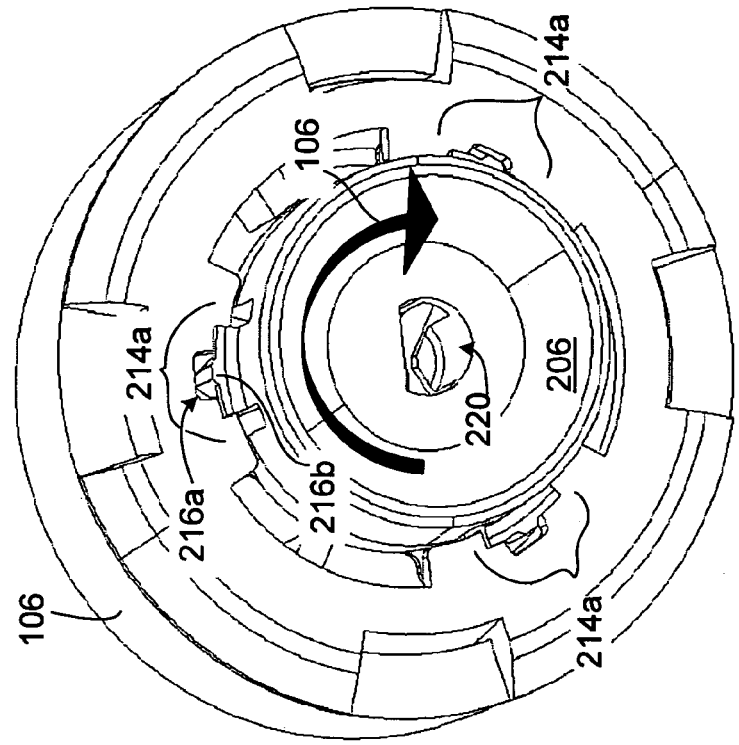
Figure 4D:
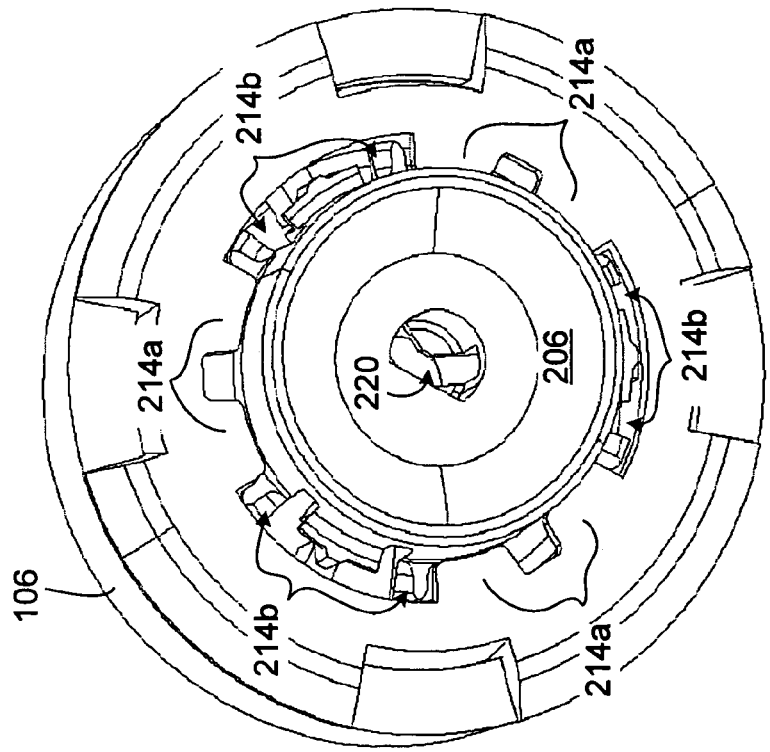

The knob 102 is assembled as shown in FIGS. 4A-E. In some examples, the clips 214 have two parts, flanges 214a on the knob 106 and tabs 214b on the hub 206. To attach the knob 106 to the hub 206, the knob 106 is positioned so that its flanges 214a are rotationally aligned between the hub's tabs 214b, as shown in FIG. 4C. The knob 106 is pressed onto the hub 206, compressing spring 208 between them, until the flanges 214a are axially aligned with the tabs 214b, as shown in FIG. 4D. As shown in FIG. 4E, the knob 106 is then rotated (arrow 402) with a torque sufficient to engage the flanges 214a and tabs 214b (obscured by the flanges in FIG. 4E), engaging the clips 214. At this point, notches 216a in the flanges 214a rotationally align with ridges 216b on the hub 206 to help control axial movement of the knob 106 when it collapses. In some examples, the design of notches 216a and ridges 216b allows the knob 106 to rotate the hub 206 even when the clips 214 are disengaged or broken and the knob 106 is in the compressed position.

Once engaged, the clips 214 will hold knob 106 and hub 206 together until an axial force exceeding the designed threshold is applied to the knob 106, transferring any forces applied to the knob 106 to the hub 206, as discussed above. In some cases, the clips are designed to withstand a force of around 53 N (12 lbf)—less than required by the EEC rule, but enough that the knob appears to the user to be solid. In some examples, the force could be in the range of about 40 N to the maximum allowed by regulation, for example, about 378 N. In some examples, the clips 214 are a cylindrical cantilevered snaps. The dimensions of such a clip can be selected by one of ordinary skill in the art to provide the desired resistance against separation. After the knob 106 and hub 206 are connected, the combination is attached to the shaft 210 by aligning hole 220 with the tip of the shaft 210 and pressing down on the knob 106, with the outer ring 104 similarly positioned with its hub 207 on the outer shaft 212, between the encoder 200 and the hub 206. In some examples, the force required to insert the hub 206 onto the shaft 210 is less than the force required to separate the clips 214. In some examples, the force required is greater, and the hub 206 is inserted onto the shaft 210 before the clips 214 are engaged. To replace a broken knob, the knob 106 is pressed in so that the flanges 214a are past the tabs 214b and ridges 216b, and then rotated to align the flanges 214a between the tabs 214b. The knob 106 can then be removed, leaving the hub 206 on the shaft 210. A replacement knob 106 can be installed by reversing this procedure, and then rotating it to engage the clips 214. In examples where the force to attach or remove the hub 206 from the shaft 210 are less than the forces required to engage or separate the clips 214, the hub 206 may be removed from the shaft 210 and attached to the replacement knob 106 before being reinstalled onto the shaft 210. In some examples, the hub 206 is replaced along with the knob 106. Replacement parts supplied to dealers or customers may include a hub 206 and knob 106 already attached with the clips 214 engaged. The replacement part may differ in design or materials from the knob and hub originally supplied with the control panel 100, for example, they may require installation forces other than those used on an assembly line.

In the examples illustrated, three clips 214 are spaced 120° apart. This provides stability to the knob 106/hub 206 assembly without significantly complicating fabrication of the parts. More or fewer clips could be used, depending on considerations such as the forces required to operate or assemble the knob, the forces that the assembly must withstand before collapsing, and the cost to manufacture and assemble the parts.

In some examples, the strength of the spring 208 is selected to provide sufficient force to enable operation of the knob 102 after clips 214 are separated, but not such great force that it causes strain on the clips 214, for example, by pushing the knob 106 outward when it is already at its fully extended position. In some examples, this is about 38 N (8.5 lbf) when the spring 208 is in its compressed (knob 106 collapsed) position. In some examples, other mechanisms are used to restore the knob 106 to its extended position, such as a compressible foam.

Other embodiments are within the scope of the following claims. For example, the outer ring 104 could also function as a push-button switch. The control could be something other than a knob, for example, a joystick.

What is claimed is:

1. An apparatus comprising
   a hand-operated control including a knob and a hub, the hub coupling axial and rotational motion of the knob to a control input,
   a first coupling member that
   (a) axially couples the knob to the hub in a first axial position, relative to the hub, when the knob is subject to a first axial force greater than a first threshold and less than a second threshold, such that axial motion of the knob and the hub caused by the first axial force is applied to the control input, and that
   (b) releases the axial coupling between the knob and the hub when the knob is subject to a second axial force greater than the second threshold, such that the knob is free to collapse to a second axial position relative to the hub, and
   a second coupling member that rotationally couples the knob to the hub in at least the first axial position, such that motion of the knob and hub caused by application of a rotational force to the knob is applied to the control input.

2. The apparatus of claim 1 also comprising a resilient element disposed between the knob and the hub, such that the resilient member applies a third axial force to restore the knob toward the first axial position whenever the knob is not in the first axial position.

3. The apparatus of claim 1 in which in the first axial position a first portion of the knob extends beyond a plane.

4. The apparatus of claim 3 in which in the second axial position the first portion of the knob does not extend beyond the plane.

5. The apparatus of claim 3 in which the first portion comprises a material having a durometer greater than 50 shore A.

6. The apparatus of claim 3 in which a second portion of the knob extends beyond the plane in both the first and second axial positions.

7. The apparatus of claim 6 in which the second portion comprises a material having a durometer less than 50 shore A.

8. The apparatus of claim 3 in which the plane is defined by a surface of a device that is controlled by the control.

9. The apparatus of claim 3 in which the plane is defined by a surface of a second control that surrounds the first control.

10. The apparatus of claim 9 in which the plane defined by the surface of the second control is about 9.75 mm from a surface of a device that is controlled by the first and second controls.

11. The apparatus of claim 9 also comprising the second control.

12. The apparatus of claim 11 in which the second control is coaxial with the knob of the first control.

13. The apparatus of claim 11 in which the second control comprises a ring concentric with the knob of the first control.

14. The apparatus of claim 1 in which the control input comprises an encoder coupled to the hub by a shaft.

15. The apparatus of claim 14 in which the encoder is configured to receive rotational input from the knob through the hub by rotation of the shaft.

16. The apparatus of claim 15 in which the encoder is also configured to receive second rotational input from a second control coaxial with the knob of the first control by rotation of a second shaft coaxial with the first shaft.

17. The apparatus of claim 14 in which the encoder is configured to receive axial input from the knob through the hub by axial movement of the shaft.

18. The apparatus of claim 1 in which the second threshold is in the range of about 40 to about 378 newtons.

19. The apparatus of claim 18 in which the second threshold is about 57 newtons.

20. An apparatus comprising
a first hand-operated control including a knob and a hub, the hub coupling axial and rotational motion of the knob to a control input,
a first coupling member that
  (a) axially couples the knob to the hub in a first axial position, relative to the hub, when the knob is subject to a first axial force greater than a first threshold and less than a second threshold, such that motion of the knob and the hub caused by the first axial force is applied to the control input, and that
  (b) releases the axial coupling between the knob and the hub when the knob is subject to a second axial force greater than the second threshold, such that the knob is free to move to a second axial position relative to the hub,
a second coupling member that rotationally couples the knob to the hub in at least the first axial position, such that motion of the knob and hub caused by application of a rotational force to the knob is applied to the control input, and
a second hand-operated control that surrounds the first control,
in which in the first axial position a first portion of the knob extends beyond a plane defined by a surface of the second control, and
in the second axial position the first portion of the knob does not extend beyond the plane.

21. An apparatus comprising
a first hand-operated control including a knob and a hub, the knob comprising a first portion having a hardness greater than about 50 shore A and a second portion having a hardness less than about 50 shore A, the hub coupling axial and rotational motion of the knob to a control input,
a first coupling member that
  (a) axially couples the knob to the hub in a first axial position, relative to the hub, when the knob is subject to a first axial force greater than a first threshold and less than about 57 newtons, such that motion of the knob and the hub caused by the first axial force is applied to the control input, and that
  (b) releases the axial coupling between the knob and the hub when the knob is subject to a second axial force greater than the second threshold, such that the knob is free to move to a second axial position relative to the hub,
a second coupling member that rotationally couples the knob to the hub in at least the first axial position, such that motion of the knob and hub caused by application of a rotational force to the knob is applied to the control input, and
a second hand-operated control comprising a ring concentric with the knob of the first control,
in which, in the first axial position the first portion of the knob extends beyond a plane defined by a surface of the second control,
in which, in the second axial position the first portion of the knob does not extend beyond the plane, and
in which, the second portion of the knob extends beyond the plane in both the first and second axial positions.

22. A user interface device for use in automobiles, the device comprising
a control knob for controlling at least one function of the device and mounted on a hub, the hub coupling axial and rotational motion of the first control to a control input of the device,
a first coupling member that
  (a) axially couples the control knob to the hub in a first axial position, relative to the hub, when the control knob is subject to a first axial force greater than a first threshold and less than a second threshold, such that motion of the control knob and the hub caused by the first axial force is applied to the control input, and that
  (b) releases the axial coupling between the control knob and the hub when the control knob is subject to a second axial force greater than the second threshold, such that the control knob is free to move to a second axial position relative to the hub,
a second coupling member that rotationally couples the control knob to the hub in at least the first axial position, such that motion of the control knob and hub caused by application of a rotational force to the first control is applied to the control input, and
a hand-operated control ring for controlling at least one second function of the device and that surrounds the control knob;
in which, in the first axial position a first portion of the control knob extends beyond a plane defined by a surface of the control ring, and
in which, in the second axial position the first portion of the control knob does not extend beyond the plane.

23. The apparatus of claim 22 in which the user interface device comprises one or a combination of
a radio; a multimedia playback device; a navigation system; a control interface for a climate control system; a communications device; and a personal computer.

24. The apparatus of claim 1 in which the first coupling member comprises complementary clip structures on the hub and knob that maintain an axially rigid linkage between the hub and knob when the knob is subject to the first axial force and release the linkage when the knob is subject to the second axial force.

25. The apparatus of claim 24 in which the complementary clip structures restore the axially rigid linkage upon return of the knob to the first axial position.

26. The apparatus of claim 24 in which the second coupling member comprises complementary finger and groove features of the clip structures that maintain a rotationally rigid linkage between the hub and knob.

27. The apparatus of claim 2 in which the resilient element couples the knob to the hub, such that movement of the knob, relative to the hub, caused by a fourth axial force causes movement of the hub sufficient to activate the control input, wherein the fourth axial force is greater than the first axial force and less than the second axial force.

* * * * *